March 23, 1954 | I. J. P. JAMES | 2,673,253
THERMIONIC VALVE AMPLIFIER
Filed Feb. 9, 1949
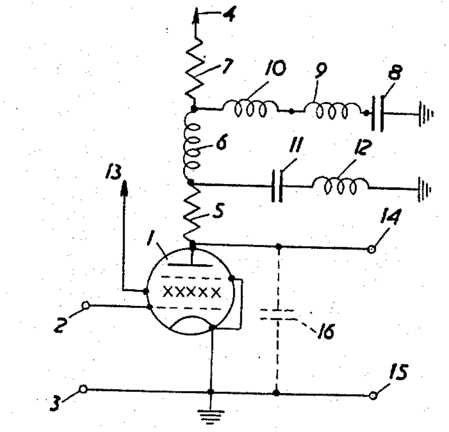
Inventor:
I. J. P. JAMES
By J. O. Oliver,
Attorney Patented Mar. 23, 1954 2,673,253

UNITED STATES PATENT OFFICE 2,673,253

THERMIONIC VALVE AMPLIFIER

Ivanhoe John Penfound James, London, England, assignor to Electric & Musical Industries Limited, Hayes, England, a British company Application February 9, 1949, Serial No. 75,327

Claims priority, application Great Britain February 14, 1948

1 Claim. (Cl. 179—171)

This invention relates to thermionic valve amplifiers.

Such amplifiers are frequently required to amplify signals extending over a wide range of frequencies and in order to avoid the relative attenuation which would otherwise occur at higher frequencies in said range due to stray anode-to-cathode capacities of the valves of the amplifier, it has been proposed to provide the anodes of said valves with filter type external circuits which are tuned by means of said stray capacities. One common form of said external circuit comprises a resistance connected in series with a peaking circuit in the form of an inductor and a condenser connected in shunt with said inductor, the end of said resistance remote from the peaking circuit being connected to the anode of the valve and the end of the peaking circuit remote from the resistance being decoupled by means of a decoupling condenser to a point which does not vary in potential with said signals. The peaking circuit serves to extend the passband of the circuit, at the high frequency end thereof, but the arrangement has however the disadvantage that, in practice, condensers such as would be employed for decoupling purposes have appreciable inherent inductances and moreover the leads utilised for connection to a decoupling condenser also have appreciable inherent inductance, especially where a screened lead is employed as described in the United States Patent No. 2,267,095. Such inherent inductance can cause distortion of the amplitude frequency response characteristic of the filter circuit and can effectively reduce the decoupling effected by said decoupling condenser for high frequency signals with the result that instability of the amplifier may be caused at frequencies beyond the pass range of the amplifier.

The object of the present invention is to reduce the aforesaid disadvantage.

According to the present invention in a wide-band amplifier circuit including at least one thermionic valve having an output electrode, there is provided an impedance connected at one end to said output electrode, and a peaking circuit in series with said impedance in the alternating current circuit of said output electrode and connected from the other end of said impedance to a point of substantially fixed potential, said peaking circuit having parallel arms one of which includes a condenser and another of which includes an inductor and a decoupling condenser with one side of the decoupling condenser connected to said point, whereby inherent inductance in series with said decoupling condenser is incorporated in said peaking circuit.

In order that the said invention may be clearly understood and readily carried into effect, the same will now be more fully described with reference to the accompanying drawing wherein a thermionic valve amplifier according to one example of the invention is diagrammatically illustrated.

Referring to the drawing, the amplifier comprises a pentode valve 1 and the signals to be amplified are applied, suitably biassed, between the control electrode and the cathode of the valve 1 by means of the terminals 2 and 3, said cathode being earthed. The anode of the valve is connected to a source of positive potential indicated at 4 via a load resistance 5 and inductor 6 connected in series and via a large decoupling resistance 7, the junction of the inductance 6 and resistance 7 being connected to earth by a decoupling condenser 8. The connections to the condenser 8 may be effected by means of a screened lead in the manner described in the aforesaid United States Patent No. 2,267,095 although, since the drawing is diagrammatic the actual manner of connection is not shown on the drawing. The inherent inductance of the condenser 8 and said lead are shown as inductances 9 and 10 respectively, in series with the condenser 8. A condenser 11 and an inductor 12 are connected in series with each other between the end of the inductor 6 remote from the condenser 8, and earth, the condenser 8 being earthed in practice at the point where the condenser 11 and inductor 12 are earthed. The screen electrode of the valve 1 is connected to a source of suitable positive potential indicated at 13 while the suppressor electrode is connected to the cathode, and the output of the amplifier is taken from between the anode and the cathode of the valve 1 by means of the terminals 14 and 15, the output being applied either directly or through a coupling condenser to a control electrode of a further valve or to a load impedance. The dotted condenser 16 represents the stray anode-to-cathode capacity of the valve 1 and the associated circuit.

It will be observed that the condenser 11 and inductor 12 form one arm of a peaking circuit effectively in shunt with a second arm thereof which, for high frequency signals, comprises the inductances 6, 9 and 10 connected in series. The resistance 7, being comparatively high in value, has a negligible shunting effect across the inductances 9 and 10. The resistance 5, the inductor 6 and the inductances 9 and 10, the condenser 11 and inductor 12, and the capacity 16 therefore form a band-pass filter network of the form referred to in the second paragraph of this specification, and this filter circuit is tuned so as to provide a substantially flat amplitude-frequency response characteristic for the amplifier over a wide range of frequencies, say, from 25 C. P. S. to 25 mc./s. The inherent inductances 9 and 10 are so incorporated in the peaking circuit that they merely add to the value of the inductor 6 and do not distort the response characteristic of the amplifier, the value of the inductor 6 being of course selected so that with the addition of the inductances 9 and 10 the correct value of inductance in shunt with the condenser 11 and inductor 12 is provided. A suitable value for the resistance 5 is, for example, 360 ohms and the capacity 16 may be approximately 20 micro-microfarads in a practical case. A suitable total value for the inductances 6, 9 and 10 is 0.414 $CR^2$ where C is the value of the capacity 16, and R the value of the resistance 5, and a suitable value of the condenser 11 is 0.353 C and of the inductor 12 is 0.353 $CR^2$.

From the foregoing description, it will be appreciated that the elements 6, 10, 9 and 8 connected in series constitute a first alternating current path from the upper end of the resistance 5 to ground and the elements 11 and 12 connected in series constitute a second alternating current path from the upper end of the resistance 5 to ground. The elements in these two paths are parallel resonant at a predetermined frequency and constitute peaking means in the alternating current circuit from the anode of the valve 1 to the cathode, the circuit being of course completed by connection of the cathode of the valve 1 to ground. The positive potential for the anode of the valve 1 is applied from the source 4 through the resistance 7 to a point in the first of said alternating current paths between the inductor 6 and the condenser 8 which is a decoupling condenser to decouple the potential source 4 from the anode to cathode alternating current circuit.

In some applications of the invention the inductor 12 may be omitted, the other elements of the filter being unaltered. The inductor 12 enables a wider bandwidth to be obtained than when the inductor 12 is omitted, but on the other hand its omission improves the stability of the amplifier when undesired oscillations of very high frequency are liable to be picked up.

What I claim is:

A wideband amplifier circuit including at least one thermionic valve having a cathode electrode, a control electrode, and an output electrode, input connections for applying signals to be amplified between said control electrode and said cathode, an impedance connected at one end to said output electrode, a first alternating current path from the other end of said impedance to ground, said first path including the series combination of an inductor and a condenser with the condenser connected in said path with one electrode of said condenser grounded, a second alternating current path from said other end of said impedance to ground and including a condenser, means connecting said cathode electrode to ground, a source of positive potential, a conductive impedance connected from said source to a point in said first path intermediate said inductor and said first-mentioned condenser, and output connections for deriving an output of signals set up between said output electrode and ground, said first-mentioned condenser being dimensioned to decouple the potential source from said alternating current circuit from said input electrode to said cathode electrode.

IVANHOE JOHN PENFOUND JAMES.

References Cited in the file of this patent

UNITED STATES PATENTS

| Number | Name | Date |
|---|---|---|
| 1,644,004 | Zobel | Oct. 4, 1927 |
| 1,969,902 | Roberts | Aug. 14, 1934 |
| 2,156,656 | Percival | May 2, 1939 |
| 2,240,281 | Ballard | Apr. 29, 1941 |
| 2,269,694 | Schade | Jan. 13, 1942 |
| 2,278,801 | Rust et al. | Apr. 7, 1942 |
| 2,453,081 | Sziklai | Nov. 8, 1948 |
| 2,514,443 | Crosby | July 11, 1950 |
| 2,524,821 | Montgomery | Oct. 10, 1950 |

FOREIGN PATENTS

| Number | Country | Date |
|---|---|---|
| 580,099 | Great Britain | Aug. 27, 1946 |

OTHER REFERENCES

Test-Vacuum Tube Amplifiers, by Valley and Wallman, Radiation Laboratory Series, 1948, published by McGraw-Hill Book Co., pp. 72–84.